Figure 1:
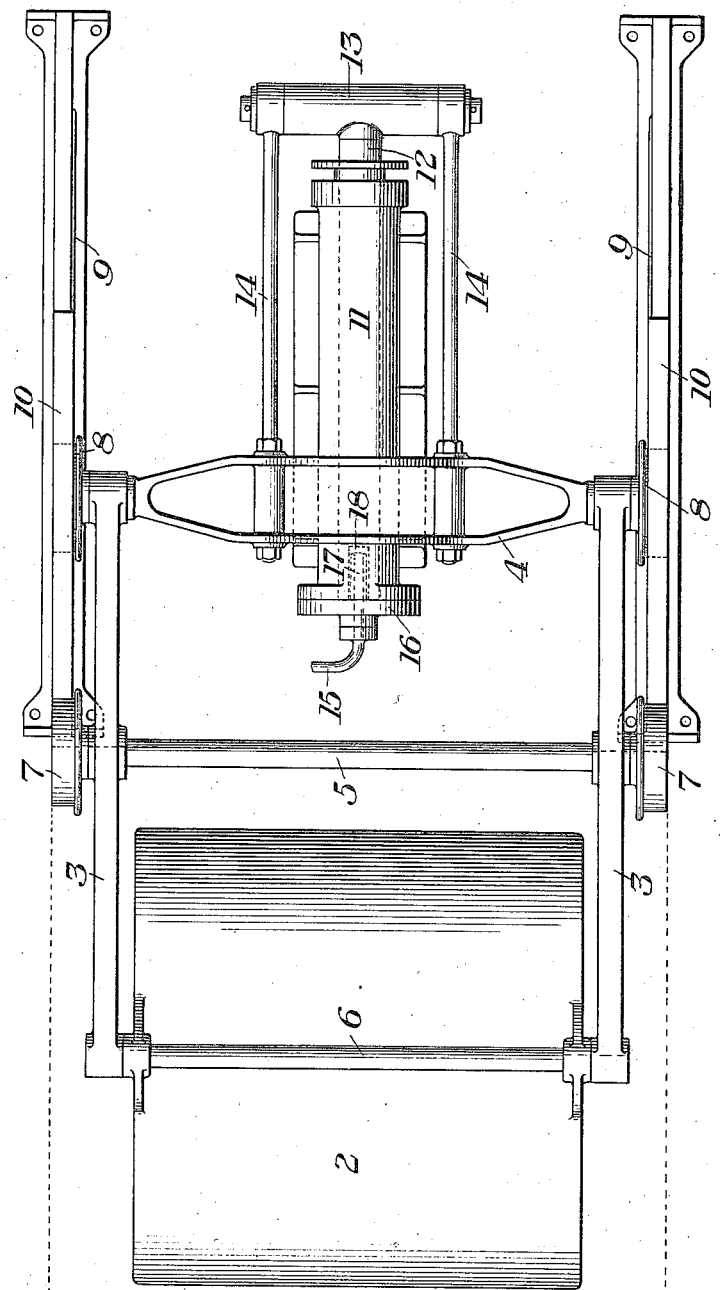

W. RACHALS.
COVER MECHANISM FOR PIT FURNACES.
APPLICATION FILED OCT. 28, 1914.

1,127,278.

Patented Feb. 2, 1915.

WITNESSES
R. A. Balderson
G. B. Bleming

INVENTOR
Walter Rachals,
by Bakewell, Byrnes & Parmelee
Attys

W. RACHALS.
COVER MECHANISM FOR PIT FURNACES.
APPLICATION FILED OCT. 28, 1914.
1,127,278.
Patented Feb. 2, 1915.
2 SHEETS—SHEET 2.
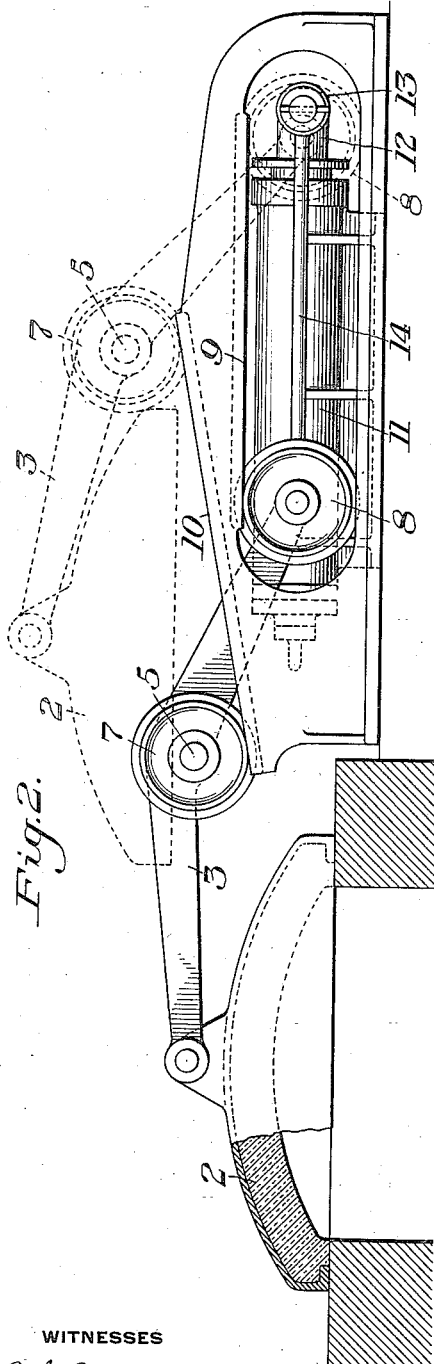
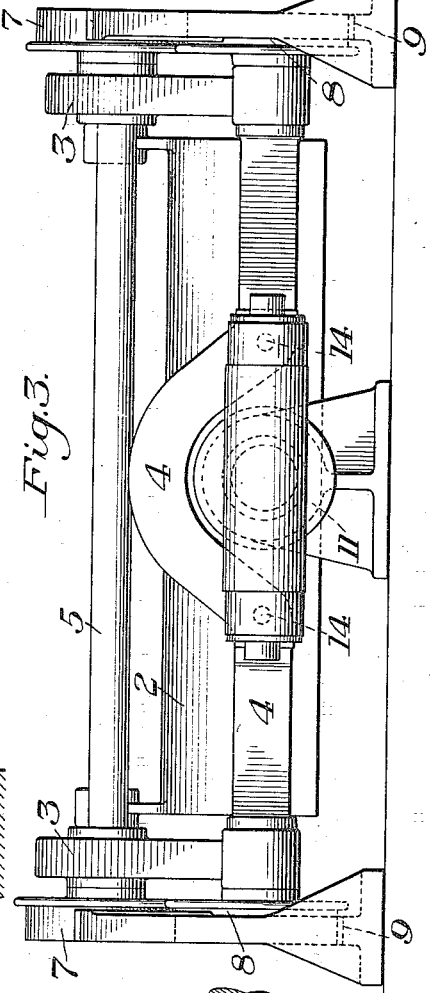
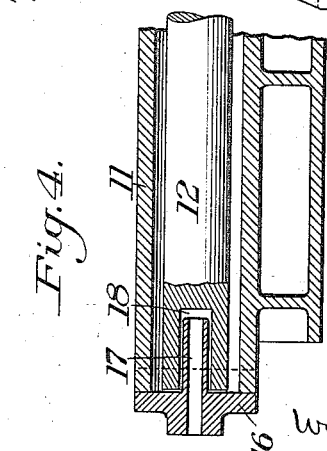
WITNESSES
INVENTOR

UNITED STATES PATENT OFFICE.

WALTER RACHALS, OF YOUNGSTOWN, OHIO.

COVER MECHANISM FOR PIT-FURNACES.

1,127,278.  Specification of Letters Patent.  Patented Feb. 2, 1915.

Application filed October 28, 1914. Serial No. 869,063.

*To all whom it may concern:*

Be it known that I, WALTER RACHALS, a citizen of the United States, residing at Youngstown, in the county of Mahoning and State of Ohio, have invented a new and useful Improvement in Cover Mechanism for Pit-Furnaces, of which the following is a full, clear, and exact description, reference being had to the accompanying drawings, forming part of this specification, in which—

Figure 1 is a plan view of a pit cover and actuating mechanism embodying my invention. Fig. 2 is a view of the same partly in vertical section and partly in side elevation. Fig. 3 is an end view, and Fig. 4 is a detail section view of a portion of the actuating cylinder.

My invention has relation to cover mechanism for pit furnaces, such as soaking pits, etc., and is designed to provide a simple and convenient mechanism of this character which can be operated by a single acting motive cylinder, and which will possess other advantages hereinafter described.

Referring to the accompanying drawings, in which I have shown the preferred embodiment of my invention, the numeral 2 designates a pit cover of the usual form, and which is supported by the two side levers 3. The rear end portions of these levers are bent downwardly and are connected by a transversely extending yoke member 4. The levers are also connected by the transverse bars or shafts 5 and 6. Each lever carries two wheels 7 and 8, the wheels 7 being shown as journaled on the ends of the bar or shaft 5, and the wheels 8 at the ends of the yoke member 4. The rear wheels 8 are arranged to travel horizontally on suitable tracks or guides 9, while the wheels 7 travel on the forwardly and downwardly inclined track surfaces 10 which are at a higher level.

11 is a single-acting hydraulic cylinder having a plunger 12 which is connected to the yoke member 4 by the cross head 13 and side rods 14.

15 is the supply pipe for the cylinder leading into its forward end through the cap 16. This cap is preferably provided with an inwardly projecting delivery nose 17 which extends loosely into a pocket 18 formed in the forward end of the plunger 12.

The operation is as follows: When actuating fluid is admitted into the forward end of the cylinder, the plunger 12 is forced backwardly and draws back the yoke member 4 and levers 3. During this movement the wheels 8 travel horizontally in line with the longitudinal axis of the plunger, but the wheels 7 ride up the inclined tracks 10, thereby effecting a lifting as well as a rearward transfer movement of the cover 2, and bringing the cover to the position shown in dotted lines in Fig. 2. By closing the control valve (not shown) and thus locking the actuating fluid in the cylinder, the parts will remain in this position as long as desired. When the control valve is opened to release this fluid, the wheels 7 will travel down the inclines 10 by gravity, and forcing the actuating fluid of the cylinder, the latter acting as a brake to prevent too rapid movement. The provision of the nose 17 and pocket 18, which are arranged to telescope in the manner shown in Fig. 4, gives a further braking action toward the end of the movement, by throttling the exhaust.

The advantages of my invention will be readily apparent, since it provides a cover mechanism of simple and convenient character which can be operated by a single acting hydraulic cylinder, the return movement being effected wholly by gravity. The action of the inclined tracks in effecting a lifting of the cover as soon as the movement commences, prevents any drag of the cover.

I do not desire to limit myself to the particular construction, combination, and arrangement of parts, as herein shown and described, it being obvious that these may be changed in various ways within the spirit and scope of the invention as defined in the appended claims.

I claim:

1. A pit furnace cover, a supporting lever therefor, said lever having two sets of wheels, and tracks or guides for said wheels, one of said tracks being substantially horizontal and the other one being inclined throughout at least the major portion of its length to effect a gravity return movement of the parts, and a single-acting motor connected to said lever, substantially as described.

2. A pit furnace cover, levers supporting the same, two sets of wheels carried by said levers, tracks for said wheels at different levels, and one of said tracks being inclined to the other throughout at least the major portion of its length, and a single-acting motor operatively connected to said levers, substantially as described.

3. A pit furnace cover, a supporting lever therefor having two supporting wheels at different levels, a separate track for each of said wheels, the lower track being substantially horizontal and the upper track forwardly and downwardly inclined throughout at least the major portion of its length, and a single-acting motive cylinder operatively connected to said lever, substantially as described.

4. A pit furnace cover, a supporting lever therefor having two supporting wheels arranged to travel on separate tracks, one of which is inclined to the plane of the other track to effect a gravity return of the parts, a single-acting motor operatively connected to the lever, and braking means for controlling said gravity movement, substantially as described.

5. A pit furnace cover, a supporting lever therefor having two supporting wheels arranged to travel on separate tracks, one of which is inclined to the plane of the other track to effect a gravity return of the parts, a single-acting motor operatively connected to the lever, said cylinder having means for throttling the exhaust of the motive fluid at the end portion of the return stroke of its plunger to thereby exert a braking action upon the return movement of the parts, substantially as described.

6. A pit furnace cover normally supported in a substantially horizontal plane over the pit, a lever connected to said cover, and a truck or carriage on which the lever is mounted, said truck having two sets of wheels at different levels, a single-acting motive cylinder operatively connected to the truck or carriage, and two track surfaces for the respective sets of wheels, said track surfaces being at different levels, one of them lying in a plane substantially parallel to the direction of action of said cylinder, and the other one being in a plane which is inclined downwardly toward said cover, substantially as described.

In testimony whereof, I have hereunto set my hand.

WALTER RACHALS.

Witnesses:
ANNA LEE,
DAVID F. GRIFFITH.